(12) United States Patent
Tazaki et al.

(10) Patent No.: US 7,826,315 B2
(45) Date of Patent: Nov. 2, 2010

(54) OPTICAL DISC DRIVE AND FOCUS POSITION CONTROL METHOD

(75) Inventors: Yoshinori Tazaki, Yokohama (JP); Kazumi Sugiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 335 days.

(21) Appl. No.: 12/128,257

(22) Filed: May 28, 2008

(65) Prior Publication Data

US 2008/0298212 A1 Dec. 4, 2008

(30) Foreign Application Priority Data

May 31, 2007 (JP) ............................... 2007-145458

(51) Int. Cl.
*G11B 7/00* (2006.01)
(52) U.S. Cl. ................................... 369/44.28
(58) Field of Classification Search ........................ None
See application file for complete search history.

(56) References Cited

U.S. PATENT DOCUMENTS

| 5,452,284 | A | * | 9/1995 | Miyagawa et al. | ....... | 369/44.28 |
| 5,475,662 | A | * | 12/1995 | Miyagawa et al. | ....... | 369/44.26 |
| 5,610,897 | A | * | 3/1997 | Yamamoto et al. | ..... | 369/124.03 |
| 5,684,771 | A | * | 11/1997 | Furukawa et al. | ........ | 369/53.23 |
| 5,808,979 | A | * | 9/1998 | Ishibashi et al. | ......... | 369/44.35 |
| 5,905,703 | A | * | 5/1999 | Osada | ...................... | 369/44.41 |
| 6,665,239 | B1 | * | 12/2003 | Takahashi et al. | ........ | 369/44.23 |
| 7,426,173 | B2 | * | 9/2008 | Maegawa | ................. | 369/275.1 |
| 2007/0230304 | A1 | * | 10/2007 | Nakane et al. | ........... | 369/53.23 |
| 2007/0274174 | A1 | * | 11/2007 | Kosaki | .................... | 369/44.36 |
| 2008/0037379 | A1 | * | 2/2008 | Arakawa | ................. | 369/44.11 |

FOREIGN PATENT DOCUMENTS

| JP | 11-219530 | 8/1999 |
| JP | 2001-126269 | 5/2001 |
| JP | 2005-116104 | 4/2005 |

\* cited by examiner

*Primary Examiner*—Peter Vincent Agustin
(74) *Attorney, Agent, or Firm*—Pillsbury Winthrop Shaw Pittman, LLP

(57) ABSTRACT

According to one embodiment, a focus position control method includes irradiating a beam to an optical disc via an objective lens, receiving reflected light and outputting a signal, generating a focus error signal, detecting an amplitude of a signal high-pass-filtering the signal, detecting an intensity of a signal low-pass-filtering the signal, supplying a driving voltage corresponding to the focus error signal to a drive coil configured to move the objective lens to an optical axis direction of the beam when the amplitude is larger than the first value, or when the amplitude is not larger than the first value and the intensity is smaller than the second value, and supplying a driving voltage having a constant voltage value to the drive coil when the amplitude is not larger than the first value and the intensity is not smaller than the second value.

12 Claims, 5 Drawing Sheets

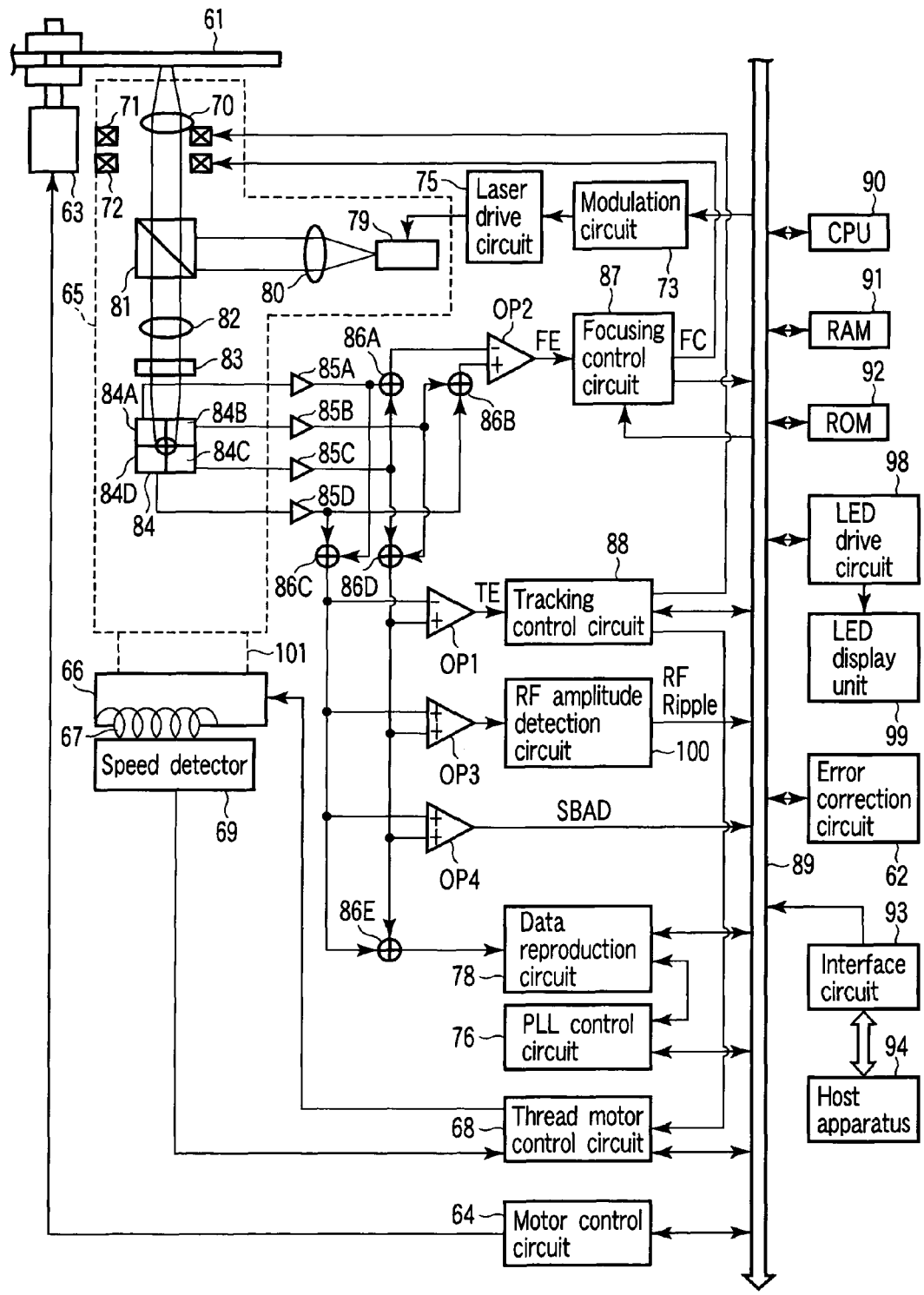
F I G. 1

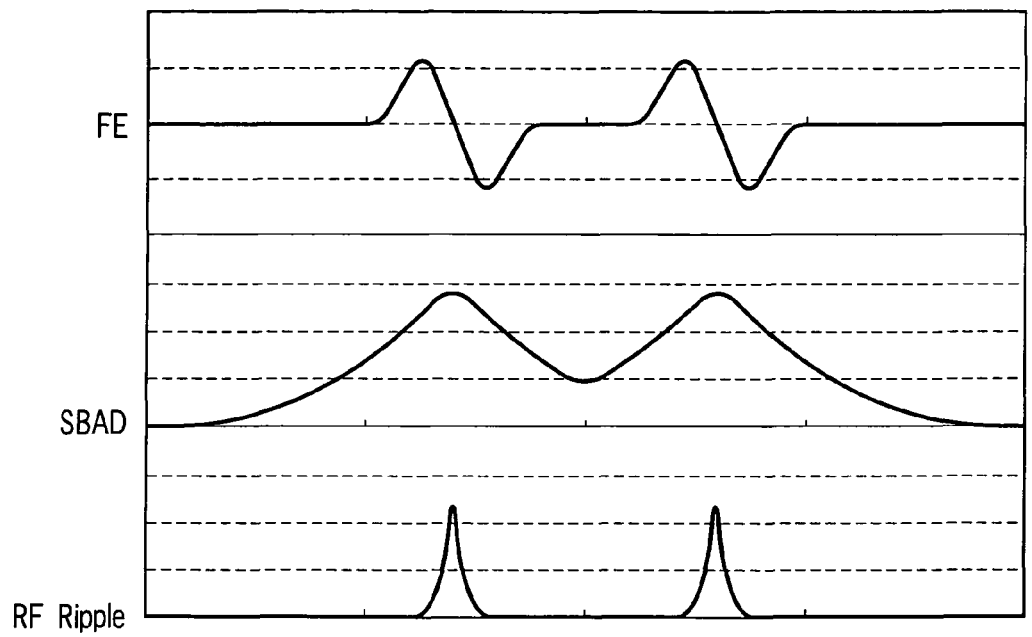
F I G. 2
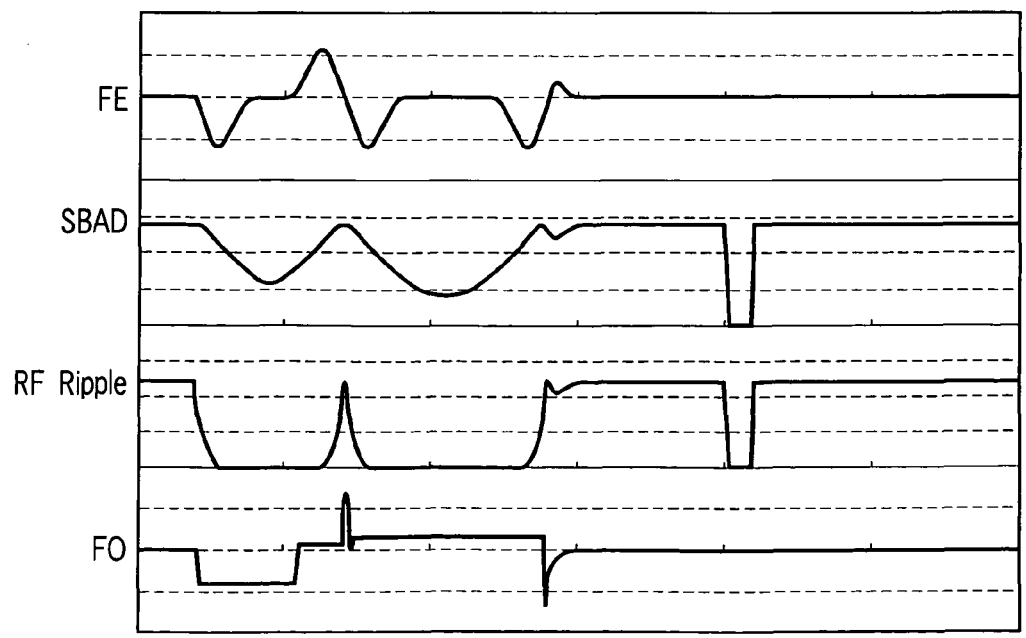
F I G. 5

OPTICAL DISC DRIVE AND FOCUS POSITION CONTROL METHOD

CROSS-REFERENCE TO RELATED APPLICATIONS

This application is based upon and claims the benefit of priority from Japanese Patent Application No. 2007-145458, filed May 31, 2007, the entire contents of which are incorporated herein by reference.

BACKGROUND

1. Field

One embodiment of the present invention relates to an optical disc drive, which moves a focus position of a light beam irradiated to an optical disc having a plurality of recording layers between these layers, and to a focus position control method.

2. Description of the Related Art

A digital versatile disc (DVD) and HD DVD have a plurality of recording layers. When information of other recording layer is reproduced from a certain recording layer, a light beam focus position is moved between layers, a so-called layer jump operation is made.

Jpn. Pat. Appln. KOKAI Publication No. 11-219530 discloses the following technique. According to the technique, amplitude information of a RF signal is monitored, and in a layer jump operation, a focus position diverges from a target position; for this reason, the amplitude of a RF signal becomes small. In this case, a hysteresis operation is carried out in order to forcedly restore the focus position to a target layer.

If a light beam passes through a damaged portion of an optical disc, the amplitude of a RF signal becomes small. Therefore, the hysteresis operation is made. As a result, servo becomes unstable; for this reason, there is a problem that time is taken until the layer jump operation is completed.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary block diagram showing the configuration of an optical disc drive according to one embodiment of the present invention;

FIG. 2 is an exemplary chart showing each waveform of a SBAD signal, a focus error signal FE and a RF amplitude information RF Ripple when an objective lens is lifted up from below;

FIG. 5 is an exemplary chart showing each waveform of a focus error signal FE, a SBAD signal SBAD, a RF amplitude information RF Ripple and a driving voltage FO when a light beam passes through a damaged portion of an optical disc.

DETAILED DESCRIPTION

Figure 3:
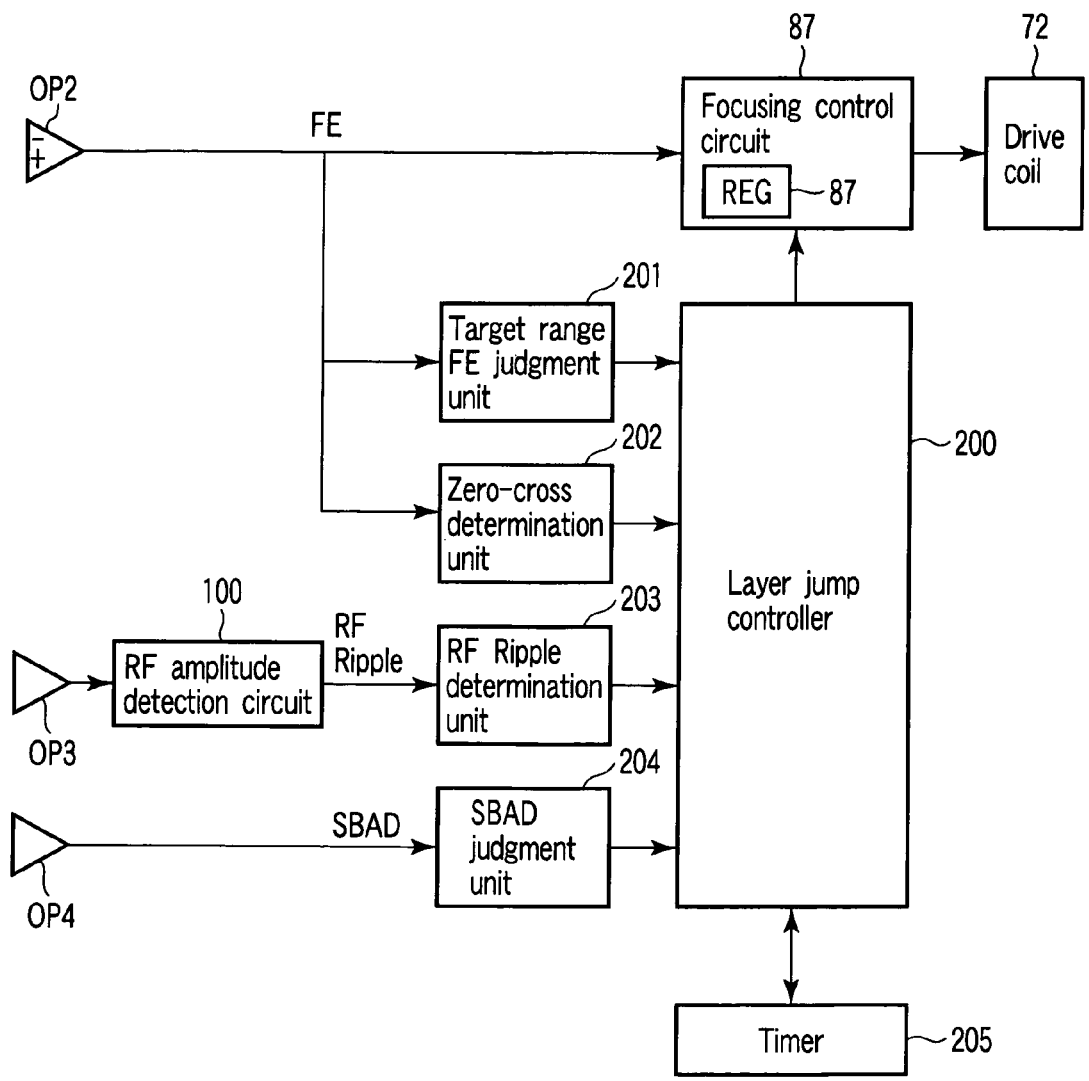
FIG. 3 is an exemplary block diagram showing the configuration for carrying out a layer jump operation in the optical disc drive.

Various embodiments according to the invention will be described hereinafter with reference to the accompanying drawings. In general, according to one embodiment of the invention, an optical disc drive detecting information recorded in an optical disc using a light beam to reproduce or record data, includes an objective lens configured to irradiate the light beam to the optical disc, a drive coil configured to move the objective lens to an optical axis of the light beam, a divided receiving device having a plurality of light receiving elements dividing and detecting reflected light or transmitted light from the optical disc, and outputting a detection signal, a focus error detector configured to generate a focus error signal from a detection signal from each light receiving element of the divided receiving device, an amplitude detector configured to detect an amplitude of a signal high-pass-filtering an addition signal of each light receiving element, an intensity detector configured to detect an intensity of a signal low-pass-filtering an addition signal of each light receiving element, an amplitude determination section configured to determine whether or not the amplitude is larger than a first threshold value, intensity determination section configured to determine whether or not the intensity is larger than a second threshold value, and a focus position controller configured to supply a driving voltage to the drive coil so that a focus position of the light beam is controlled, the focus position controller supplying a driving voltage corresponding to the focus error signal to the drive coil when the amplitude is larger than the first threshold value, or when the amplitude is not larger than the first threshold value and the intensity is smaller than the second threshold value, and supplying a driving voltage having a constant voltage value to the drive coil regardless of the focus error signal when the amplitude is not larger than the first threshold value and the intensity is not smaller than the second threshold value.

An embodiment of the present invention will be hereinafter described with reference to the accompanying drawings.

FIG. 1 is a block diagram showing the configuration of an optical disc drive according to one embodiment of the present invention.

An optical disc 61 set n an optical disc drive 11 is a user data recordable optical disc or read-only optical disc. In this embodiment, the optical disc 61 is described as an optical disc having a recordable multi-layer structure. A DVD-R is given as an optical disc having a multi-layer structure information recording surface. The present invention is not limited to the foregoing DVD-R, and any other forms may be used so long as the optical disc is a multi-layer recordable optical disc. An information recording surface of the optical disc 61 is formed with a spirally land track and groove track. The optical disc 61 is rotatably driven by a spindle motor 63.

An optical pickup 65 (portion surrounded by a broken line on the left side in FIG. 1) records and reproduces information with respect to the optical disc 61. The optical pickup 65 is connected via a connection unit 101 including a thread motor 66 and a gear. The thread motor 66 is controlled by a thread motor control circuit 68.

In FIG. 1, a speed detector (circuit) 69 positioned below the thread motor 66 detects a moving speed of the optical pickup, and is connected to the foregoing thread motor control circuit. A speed signal of the optical pickup 65 detected by the speed detector 69 is sent to the thread motor control circuit 68. A stator of the thread motor 66 is provided with a permanent magnet (not shown). A drive coil 67 is excited by the thread motor control circuit 68, and thereby, the optical pickup 65 is moved to a radius direction of the optical disc 61.

The optical pickup 65 is provided with an objective lens 70 supported by a wire or plate spring (not shown), for example. The objective lens 70 is movable to a tracking direction (perpendicular to lens optical axis) by the drive of a tracking drive coil 71. The objective lens 70 is further movable to a tracking direction (perpendicular to lens optical axis) and to a focusing direction (lens axis direction) by the drive of a focusing drive coil 72.

When information is recorded to the optical disc 61, a modulation circuit 73 receives a recording information signal from a host apparatus 94 via an interface circuit 93 and a bus 89. Then, the modulation circuit 73 modulates the received recording information signal according to a modulation format (e.g., 8-16 modulation) conformable to the standards of the optical disc 61. A laser drive circuit 75 supplies a write signal to a semiconductor laser diode 79 based on modulated data supplied from the modulation circuit 73 when information is recorded to the optical disc 61 (mark formation). The laser drive circuit 75 supplies a read signal smaller than the write signal to the semiconductor laser diode 79 when information is reproduced.

The semiconductor laser diode 79 emits a laser beam in accordance with a signal supplied from the laser drive circuit 75. The laser beam emitted from the semiconductor laser diode 79 is irradiated on the optical disc 61 via collimator lens 80, half prism 81 and objective lens 70. Reflected light from the optical disc 61 is guided to a photodetector 84 via objective lens 70, half prism 81, collective lens 82 and cylindrical lens 83.

The semiconductor laser diode 79 comprises three semiconductor laser diodes emitting the following laser beams. One is a CD (infrared: wavelength 780 nm) laser beam. Another is a DVD (red: wavelength 650 nm) laser beam. Another is an HD DVD (purple: wavelength 405 nm) laser beam. These semiconductor laser diodes may be received in the same CAN package. Or, these three semiconductor laser diodes are each received in independent three CAN packages, and independently arranged on the base of the optical pickup 65. The configuration and arrangement of an optical system are properly changed in accordance with the configuration of a semiconductor laser.

Of components forming the optical system, that is, the objective lens 70 is designed so that an HD DVD laser beam is properly focused on the optical disc. The optical system includes an aberration correcting element (diffraction element, phase correcting element, etc.) and a numerical aperture limiter (liquid crystal shutter, diffraction element, etc.). The aberration correcting element corrects an aberration occurring when DVD laser beam and CD laser beam are used. The numerical aperture limiter limits a numerical aperture with respect to the objective lens when the CD laser beam is used.

The photodetector 84 is composed of four divided photodetection cells 84A to 84D. Output signals of these photodetection cells 84A to 84D of the photodetector 84 are supplied to the following adders 86A to 86D via current/voltage conversion amplifiers 85A to 85D, respectively. The adder 86A adds outputs from the photodetection cells 84A and 84B. The adder 86B adds outputs from the photodetection cells 84D and 84B. The adder 86C adds outputs from the photodetection cells 84A and 84B. The adder 86D adds outputs from the photodetection cells 84D and 84B. Outputs of the adders 86A and 86B are supplied to a differential amplifier OP2, and outputs of the adders 86C and 86D are supplied to a differential amplifier OP1.

The differential amplifier OP2 generates a focus error signal FE in accordance with the difference between two output signals of the adders 86A and 86B. The focus error signal FE is supplied to a focusing control circuit 87. An output signal FC of the focusing control circuit 87 is supplied to a focusing drive coil 72. Based on the supplied output signal FC of the focusing control circuit 87, a laser beam is controlled so that it is always precisely focused on a recording surface of the optical disc 61. The focusing control circuit 87 further has a measurement function of measuring the amplitude of the focus error signal FE. The measured value is output to a CPU 90 via a bus 89.

The differential amplifier OP1 generates a tracking error signal TE in accordance with the difference between two output signals of the adders 86C and 86D. The tracking error signal TE is supplied to a tracking control circuit 88. The tracking control circuit 88 generates a tracking drive signal in accordance with the tracking error signal TE. The tracking drive signal output from the tracking control circuit 88 is supplied to a tracking drive coil 71, which moves the objective lens 70 to a direction perpendicular to the optical axis. Based on the supplied tracking drive signal, a laser beam is controlled so that it is irradiated to a predetermined portion on the recording surface of the optical disc 61. In addition, the tracking error signal TE used for the tracking control circuit 88 is supplied to the thread motor control circuit 68.

Focusing control and tracking control are carried out in the manner described above. In this way, a sum signal of the output signals from photodetection cells 84A to 84D of the photodetector 84, that is, an output sum signal RF of an adder 86E adding two output signals from adders 86C and 86D serves to obtain a signal faithful to recording information. The output sum signal RF is supplied to a data reproduction circuit 78.

An operational amplifier OP3 adds two output signals of adders 86C and 86D to generate a high-pass filtering signal with respect to the addition signal. An output signal (RF signal) of the operational amplifier OP3 is supplied to a RF amplitude detection circuit 100 to generate a signal (RF Ripple) having a level proportional to the amplitude of the RF signal. The RF amplitude detection circuit 100 comprises a circuit, which detects the peak value and the bottom value of the RF signal to obtain the difference value between the foregoing peak and bottom values.

An operational amplifier OP4 adds two output signals of adders 86C and 86D (addition signal of outputs from detection cells 84A to 84D) to carry out low-pass filtering with respect to the addition signal. The operational amplifier OP4 detects the signal intensity of the low-pass filtered addition signal to generate a sub-beam addition (SBAD) signal in accordance with the intensity.

A data reproduction circuit 78 positioned at the lowermost portion in FIG. 1 reproduces read recording data based on a reproduction clock from a PLL circuit 76. The data reproduction circuit 78 further has a measurement function of measuring the amplitude of the signal RF. The measured value is output to the CPU 90 via the bus 89.

The thread motor control circuit 68 controls the thread motor 66 to move the body of the optical pickup 65 so that the objective lens 70 is positioned in the vicinity of the center position in the optical pickup 65.

The foregoing motor control circuit 64, thread motor control circuit 68, modulation circuit 73, laser drive circuit 75, PLL circuit 76, data reproduction circuit 78, focusing control circuit 87, and tracking control circuit 88 are integrated on one LSI chip. These circuits are controlled by the CPU 90 via the bus 89. The CPU 90 comprehensively controls the optical disc recording/reproducing drive according to an operation command supplied from a host apparatus 94 via an interface circuit 93. The CPU 90 uses a RAM 91 as a work area, and executes predetermined controls according to a program including procedures of this embodiment recorded in a ROM 92.

The layer jump operation will be hereinafter described. According to this embodiment, the foregoing focus error signal FE, RF amplitude information RF Ripple and SBAD signal are used for layer jump control.

FIG. 2 is a chart showing waveforms of various signal when the objective lens 70 is lifted up from below. As shown in FIG. 2, a signal detection range is SBAD>FE>RF Ripple, and the signal detection range of the SBAD signal is the widest.

According to this embodiment, damage is detected in the layer jump operation using the foregoing characteristic that the signal detection range of the SBAD signal is the wide. In this way, control is carried out so that no hysteresis operation is made in the layer jump operation.

The configuration for carrying out layer jump will be hereinafter described with reference to FIG. 3.

In order to carry out the layer jump, the optical disc drive has differential amplifier Op2, operational amplifiers OP3, OP4, focusing drive coil 72, focusing control circuit 87, and RF amplitude detection circuit 100. The optical disc drive further has a layer jump controller 200, a target rage FE judgment unit 201, a zero-cross determination unit 202, a RF Ripple determination unit 203, a SBAD judgment unit 204 and a timer 205.

The foregoing layer jump controller 200, target rage FE judgment unit 201, zero-cross determination unit 202, RF Ripple determination unit 203, SBAD judgment unit 204 and timer 205 are programs executed by the CPU 90.

The focusing control circuit 87 has a register 87A. The register 87 is loaded with a voltage value of a control signal FO supplied to the focusing drive coil 72. The focusing control circuit 87 supplies a driving voltage FO to the focusing drive coil 72 in accordance with the value stored in the register 87A.

The layer jump controller 200 takes the procedure of start/stop of the layer jump operation with respect to the focusing control circuit 87. In addition, the controller 200 takes a predetermined procedure with respect to various results from target rage FE judgment unit 201, zero-cross determination unit 202, RF Ripple determination unit 203, SBAD judgment unit 204 and timer 205.

The focusing control circuit 87 turns off a focus servo when receiving instructions to start the layer jump operation from the layer jump controller 200, and then, sets a jump pulse voltage value in the register 87A. The circuit 87 changes the value stored in the register 87A so that the movement speed of the objective lens 70 becomes fast.

The target range FE judgment unit 201 determines whether or not a focus error signal FE in the layer lump operation is not a value within the target range. Thereafter, the unit 201 sends the determined result to the layer jump controller 200. If the target range FE judgment unit 201 determines that the focus error signal FE is within the target range, the layer jump controller 200 gives instructions to supply a brake pulse voltage to the focusing control circuit 87. Thereafter, the focusing control circuit 87 sets a brake pulse voltage value in the register 87A. Then, the circuit 87 changes the voltage value stored in the register 87A so that the movement speed of the objective lens 70 becomes late.

The zero-cross determination unit 202 is executed after the brake pulse voltage is supplied. The zero-cross determination unit 202 determines whether or not the focus error signal FE becomes zero-cross, and then, sends the determined result to the layer jump controller 200. Then, the layer jump controller 200 gives instructions to execute focus servo to the focusing control circuit 87. The focusing control circuit 87 stops to store the brake pulse voltage value in the register 87A, and then, stores a voltage value in accordance with the focus error signal FE.

The RF Ripple determination unit 203 is executed after servo on. The RF Ripple determination unit 203 determines whether or not RF amplitude is larger than a threshold value α, and then, sends the determined result to the layer jump controller 200. If the RF amplitude is not larger than the threshold value α, the layer jump controller 200 starts time measurement by the timer 205. So long as the timer 205 is counting, the layer jump controller 200 continues time measurement. The layer jump controller 200 refers to measurement time Tm to determine whether or not the measurement time Tm is longer than preset time Th. If the measurement time Tm is longer than the preset time Th, the controller 200 takes the procedure of stopping the layer jump operation. If the RF amplitude is not larger than the threshold value α, the layer jump controller 200 gives instructions so that the SBAD judgment unit 204 takes the procedure of determining the SBAD signal.

The SBAD judgment unit 204 determines whether or not the SBAD signal is smaller than a threshold value β, and ten, sends the determined result to the layer jump controller 200. If the SBAD signal is smaller than the threshold value β, the layer jump controller 200 starts time measurement by the timer 205. So long as the timer 205 is counting, the controller 200 continues time measurement. The layer jump controller 200 refers to measurement time Tm to determine whether or not the measurement time Tm is longer than preset time Th. If the measurement time Tm is longer than the preset time Th, the controller 200 takes the procedure of stopping the layer jump operation.

If the SBAD signal is larger than the threshold value β, the layer jump controller 200 determines that a focus position passes through a target layer. Thereafter, the controller 200 gives instructions to carry out a hysteresis operation to the focusing control circuit 87. The focusing control circuit 87 stops the focus servo, and then, continues to supply a drive voltage FO to the focusing drive coil 72 in accordance with the value stored in the register 87A. In other words, the focusing control circuit 87 supplies the drive voltage FO to the focusing drive coil 72 in accordance with the preset value stored in the register 87A. As a result, the objective lens 70 is focused to a target layer.

The layer jump controller 200 resets the measurement time of the timer 205 to stop time measurement by the timer 205.

Figure 4:
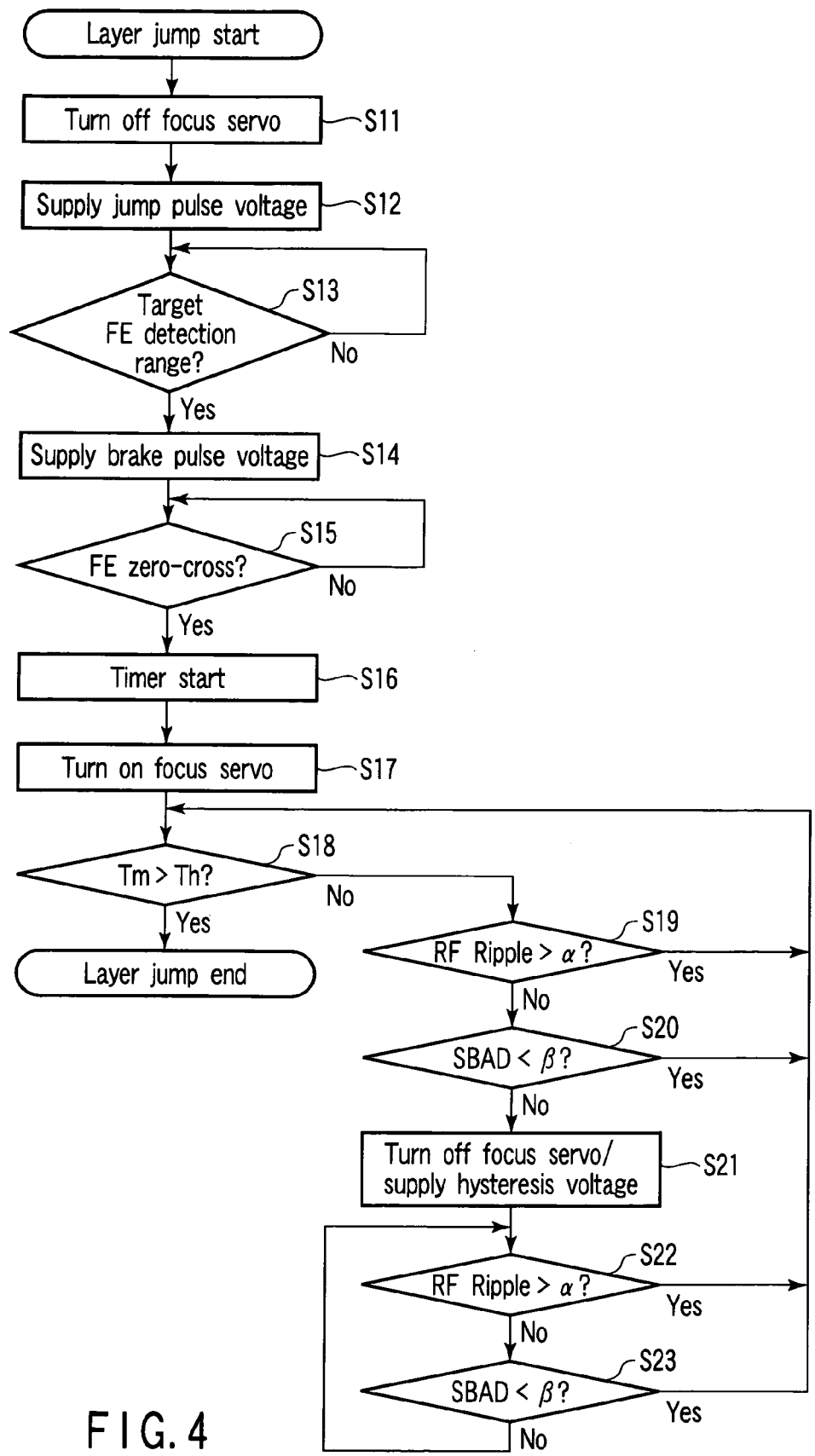
FIG. 4 is an exemplary flowchart to explain the procedure of the layer jump operation.

The procedure of the layer lump operation will be hereinafter described with reference to a flowchart of FIG. 4.

When a focus servo turns on, the layer jump controller 200 turns off the focus servo by the focusing control circuit 87 (step S11).

When the focus servo is in a turn off state, the focusing control circuit 87 outputs a jump pulse voltage as an output signal FC to the focusing drive coil 72 (step S12). The jump pulse voltage is supplied, ad thereby, the focusing drive coil 72 moves the objective lens 70 so that the movement speed of the objective lens increases.

The target range FE judgment unit 201 determines whether or not the focus error signal FE is within the target range (step S13). The target range is set in accordance with a jump target layer.

If it is determined that the focus error signal FE is within the target range (Yes in step S13), the layer jump controller 200 gives instructions to supply a brake pulse voltage to the focusing control circuit 87. The focusing control circuit 87 outputs the brake pulse voltage to the focusing drive coil 72 (step S14). The jump pulse voltage is supplied, and thereby, the focusing drive coil 72 moves the objective lens 70 so that the movement speed of the objective lens 70 decreases. The movement speed is decreased, and thereby, the magnitude of overshoot is made small.

The zero-cross determination unit 202 determines whether or not the focus error signal is zero-cross (step S15). The focusing control circuit 87 continues to supply a brake pulse voltage to the focusing drive coil 72 until the focus error signal becomes zero-cross.

If it is determined that the focus error signal becomes zero-cross, the layer jump controller 200 starts a time measurement by the timer 205 (step S16). The layer jump controller 200 gives instructions to execute focus servo to the focusing control circuit 87. Then, the focusing control circuit 87 starts a focus servo operation (step S17).

The layer jump controller 200 determines whether or not the measurement time Tm of the timer 205 is longer than a preset time Th (step S18). If it is determined that the measurement time is not longer than the preset time Th (No in step S18), the RF Ripple determination unit 203 determines whether or not RF amplitude is larger than a threshold value $\alpha$ (step S19). If it is determined that the RF amplitude is larger than the threshold value $\alpha$, the procedure returns to step S18.

If it is determined that the RF amplitude is not larger than the threshold value $\alpha$ (No in step S19), the SBAD judgment unit 204 determines whether or not a SBAD signal is smaller than a threshold value $\beta$ (step S20). If it is determined that the SBAD signal is smaller than the threshold value $\beta$ (Yes in step S20), it is determined that the RF amplitude is in a state of being not larger than the threshold value $\alpha$ due to damage. Then, the procedure returns to step S18.

If it is determined that the SBAD signal is not smaller than the threshold value $\beta$ (No in step S20), the layer jump controller 200 gives instructions to stop a focus servo operation and to execute hysteresis operation to the focusing control circuit 87 (step S21). The focusing control circuit 87 stops the focus servo operation, and then, supplies a driving voltage FO having a voltage value stored in the register 87A to the focusing drive coil 72.

The RF Ripple determination unit 203 determines whether or not the RF amplitude is larger than the threshold value $\alpha$ (step S22). If it is determined that the RF amplitude is not larger than the threshold value $\alpha$ (No in step S22), the SBAD judgment unit 204 determines whether or not a SBAD signal is smaller than the threshold value $\beta$ (step S23). If it is determined that the SBAD signal is not smaller than the threshold value $\beta$ (No in step S23), the layer jump controller 200 takes the procedure of step S22.

If it is determined that the RF amplitude is larger than the threshold value $\alpha$ (Yes in step S22) or the SBAD signal is smaller than the threshold value $\beta$ (Yes in step S23), the layer jump controller 200 returns to the procedure of step S18.

In step S18, if it is determined that the measurement time Tm is longer than a preset time Th (Yes in step S18), the layer jump controller 200 takes the procedure of ending the layer jump operation, and thus, the layer jump operation ends.

According to the foregoing operation, the hysteresis operation controlled using the RF amplitude and the SBAD signal. On the contrary, in the conventional case, a reference to RF amplitude is made to control the hysteresis operation. When a laser beam passes through servo disturbance place such as damage, the RF amplitude becomes small, and thus, malfunction occurs. As a result, servo is not suitably operated. In order to specify a damage position, the damage is detected to make a round of the disc. For this reason, access time is excessively taken.

According to this embodiment, even if the RF amplitude becomes small, a reference to the SBAD signal is made, and thereby, it is determined the RF amplitude becomes small due to damage, and therefore, there is no need of carry out the hysteresis operation. The hysteresis operation is issued in the limited case where the RF amplitude is not larger than a certain threshold value $\alpha$ and the SBAD signal is not smaller than a certain threshold value $\beta$.

FIG. 5 is a chart showing each waveform of a focus error signal, a SBAD signal SBAD, a RF amplitude information RF Ripple and a driving voltage FO when a laser beam passes through a damage portion of an optical disc. Even if the laser beam passes through the damage portion, it can be seen that a hysteresis voltage is not applied. As a result, layer jump is stably succeeded.

Figure 6:
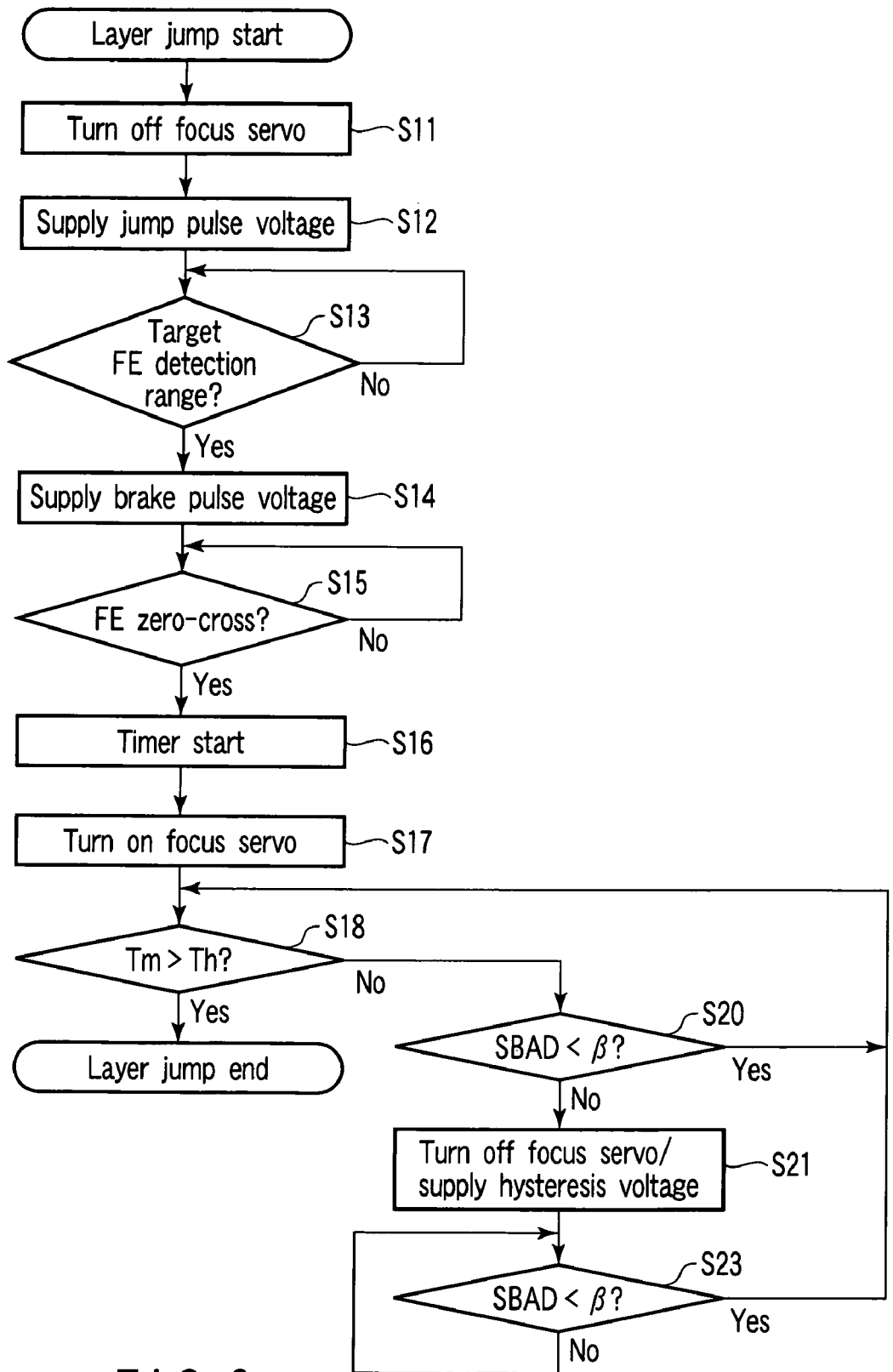
FIG. 6 is an exemplary flowchart to explain the procedure of another layer jump operation.

As shown in a flowchart of FIG. 6, the procedures of making comparisons of RF amplitude and threshold value $\alpha$ in steps S18 and S22 are omitted. A comparison is made between the intensity of the SBAD signal and the threshold value $\beta$, and thereby, the hysteresis operation may be controlled.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An optical disc drive detecting information recorded in an optical disc using a light beam to reproduce or record data, comprising:
    an objective lens configured to irradiate the light beam to the optical disc;
    a drive coil configured to move the objective lens to an optical axis of the light beam;
    a divided receiving device having a plurality of light receiving elements dividing and detecting reflected light or transmitted light from the optical disc, and outputting a detection signal;
    a focus error detector configured to generate a focus error signal from a detection signal from each light receiving element of the divided receiving device;
    an amplitude detector configured to detect an amplitude of a signal high-pass-filtering an addition signal of each light receiving element;
    an intensity detector configured to detect an intensity of a signal low-pass-filtering an addition signal of each light receiving element;
    an amplitude determination section configured to determine whether or not the amplitude is larger than a first threshold value;
    intensity determination section configured to determine whether or not the intensity is larger than a second threshold value; and
    a focus position controller configured to supply a driving voltage to the drive coil so that a focus position of the light beam is controlled, the focus position controller supplying a driving voltage corresponding to the focus error signal to the drive coil when the amplitude is larger than the first threshold value, or when the amplitude is not larger than the first threshold value and the intensity is smaller than the second threshold value, and supplying a driving voltage having a constant voltage value to the drive coil regardless of the focus error signal when the amplitude is not larger than the first threshold value and the intensity is not smaller than the second threshold value.

2. The drive according to claim 1, wherein procedures of the amplitude determination section and the intensity determination section are taken in a layer jump operation,
in a state except the layer jump operation, the focus position controller supplies a control signal to the drive coil in accordance with the focus error signal.

3. The device according to claim 2, further comprising:
a timer configured to count time after a focal point of the light beam passes through a jump layer in the layer jump operation; and
a layer jump operation ending unit configured to end the layer jump operation when a measurement time of the timer is more than a preset time.

4. An optical disc drive detecting information recorded in an optical disc using an light beam to reproduce or record data, comprising:
an objective lens configured to irradiate the light beam to the optical disc;
a drive coil configured to move the objective lens to an optical axis of the light beam;
a divided receiving device having a plurality of light receiving elements dividing and detecting reflected light or transmitted light from the optical disc, and outputting a detection signal;
a focus error detector configured to generate a focus error signal from a detection signal from each light receiving element of the divided receiving device;
an amplitude detector configured to detect an amplitude of a signal high-pass-filtering an addition signal of each light receiving element;
an intensity detector configured to detect an intensity of a signal low-pass-filtering an addition signal of each light receiving element;
intensity determination section configured to determine whether or not the intensity is larger than a threshold value; and
a focus position controller configured to supply a driving voltage to the drive coil so that a focus position of the light beam is controlled, the focus position controller supplying a driving voltage corresponding to the focus error signal to the drive coil when the intensity is smaller than the threshold value, and supplying a driving voltage having a constant voltage value to the drive coil regardless of the focus error signal when the intensity is not smaller than the threshold value.

5. The drive according to claim 4, wherein procedures of the amplitude determination section and the intensity determination section are taken in a layer jump operation,
in a state except the layer jump operation, the focus position controller supplies a control signal to the drive coil in accordance with the focus error signal.

6. The device according to claim 5, further comprising:
a timer configured to count time after a focal point of the light beam passes through a jump layer in the layer jump operation; and
a layer jump operation ending unit configured to end the layer jump operation when a measurement time of the timer is more than a preset time.

7. A focus position control method used for an optical disc drive detecting information recorded in an optical disc using an light beam to reproduce or record data, comprising:
irradiating an light beam to an optical disc via an objective lens;
receiving dived reflected light or transmitted light from the optical disc, and outputting a detection signal each of the dived light;
generating a focus error signal from a detection signal of each dived light;
detecting an amplitude of a signal high-pass-filtering an addition signal of detection signal of each dived light;
detecting an intensity of a signal low-pass-filtering the addition signal;
determining whether or not the amplitude is larger than a first threshold value;
determining whether or not the intensity is smaller than a second threshold value at last when the amplitude is not larger than the first threshold value;
supplying a driving voltage corresponding to the focus error signal to a drive coil configured to move the objective lens to an optical axis direction of the light beam when the amplitude is larger than the first threshold value, or when the amplitude is not larger than the first threshold value and the intensity is smaller than the second threshold value; and
supplying a driving voltage having a constant voltage value to the drive coil regardless of the focus error signal when the amplitude is not larger than the first threshold value and the intensity is not smaller than the second threshold value.

8. The method according to claim 7, wherein a comparison of the amplitude with the first threshold value and a comparison of the intensity with the second threshold value are made in a layer jump operation, and
the control signal corresponding to the focus error signal is supplied to the drive coil in a state except the layer jump operation.

9. The method according to claim 8, further comprising:
counting time after a focal point of the light beam passes through a jump layer in the layer jump operation; and
ending the layer jump operation when the count time is more than a preset time.

10. A focus position control method used for an optical disc drive detecting information recorded in an optical disc using an light beam to reproduce or record data, comprising:
irradiating an light beam to an optical disc via an objective lens;
receiving light by a divided receiving device having a plurality of light receiving elements dividing and detecting reflected light or transmitted light from the optical disc, and outputting a detection signal;
generating a focus error signal from a detection signal from each light receiving element of the divided receiving device;
detecting an intensity of a signal low-pass-filtering an addition signal of each light receiving element;
determining whether or not the intensity is smaller than a threshold value;
supplying a driving voltage corresponding to the focus error signal to a drive coil configured to move the objective lens to an optical axis direction of the light beam when the intensity is smaller than the threshold value; and
supplying a driving voltage having a constant voltage value to the drive coil regardless of the focus error signal when the intensity is not smaller than the threshold value.

11. The method according to claim 10, wherein a comparison of the intensity with the threshold value are made in a layer jump operation, and the control signal corresponding to the focus error signal is supplied to the drive coil in a state except the layer jump operation.

12. The method according to claim 11, further comprising:

counting time after a focal point of the light beam passes through a jump layer in the layer jump operation; and ending the layer jump operation when the count time is more than a preset time.

\* \* \* \* \*